April 30, 1957 — A. J. GILBERT, JR — 2,790,884

MINIATURE CRYSTAL OVEN

Filed May 6, 1955

United States Patent Office 2,790,884
Patented Apr. 30, 1957

2,790,884

MINIATURE CRYSTAL OVEN

Alfred J. Gilbert, Jr., Matawan, N. J., assignor to Lavoie Laboratories, Inc., Morganville, N. J., a corporation of New Jersey Application May 6, 1955, Serial No. 506,475

13 Claims. (Cl. 219—19)

The present invention relates to constant temperature chambers such as those used for maintaining electrical or other elements or units at a constant temperature.

The operating characteristics of certain electrical units, for example crystals, vary with temperature. In order to maintain the operating characteristics of such units constant, it is necessary to keep them at a constant temperature. For this purpose, the units are enclosed in chambers the temperature of which is accurately controlled. As it is more convenient to maintain the temperature of the chamber constant by the application of heat rather than by cooling, the chamber is provided with an electrical heater controlled by a thermostat. In order to keep the chamber at a constant temperature despite fluctuations of outside or ambient temperature over a wide range, the thermostat is set for a temperature somewhat above the highest expected ambient temperature, for example at a temperature of 75° or 85° C. For this reason, such chambers are often referred to as "ovens." The invention is particularly applicable to crystal ovens and will be described with reference to chambers of that type. While, as a matter of convenience, the chamber may herein be referred to as a "crystal oven," it will be understood that the invention is in no way limited to chambers used for crystals and that the term is used by way of example and not as a limitation. Thus, what is said with respect to crystal ovens applies also to other constant temperature chambers where similar requirements must be met.

It is an object of the present invention to provide crystal ovens and like constant temperature chambers having the following characteristics:

1. Small size and light weight, making the oven suitable for use in miniaturized circuits.

2. Good thermal connection between the thermostat and the chamber. As a thermostat reacts only to its own temperature, a close relationship between the thermostat and the chamber assures optimum temperature control of the chamber.

3. Fast cycling of the thermostat to correct for even minor deviations from the selected temperature.

4. Large contact movement of the thermostatic switch controlling the heater of the oven to minimize arcing and the effect of contact wear and provide reliability of operation.

5. Thermal isolation of the crystal or other element from ambient temperature changes.

6. High contact pressures and a wiping action of the contacts to break down any film or barrier between the contacts, thereby assuring proper operation without the need of using sealed contacts.

7. Simple construction lending itself to economical manufacture. The construction is, for the most part, from sheet material and precise temperature control is obtained without close manufacturing tolerances.

8. Convenient adjustability and retention of the adjustment made.

9. Easy accessibility of the crystal or other element in the oven.

10. Freedom from the generation of electrical noise in associated circuits resulting from the opening and closing of the heater contacts.

These and other characteristics of constant temperature chambers in accordance with the invention will be more fully understood from the following description and claims in conjunction with the accompanying drawings which illustrate, by way of example, a crystal oven constructed in accordance with the invention. In the drawings:

Figure 1:
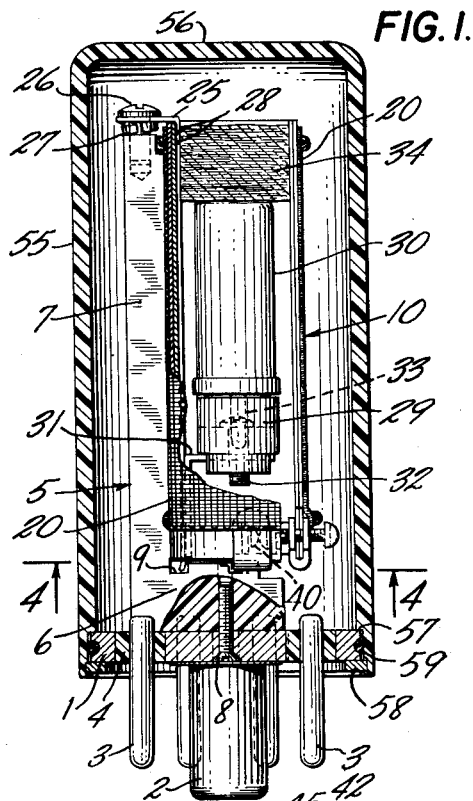
Fig. 1 is an enlarged side elevation with the cover and base shown in vertical section and portions of the oven broken away to show the interior.

In the embodiment illustrated in the drawings, the oven is mounted on a standard electron tube base 1 having a hollow center post 2 and a plurality of pins 3 each insulated from the base by a bushing 4. An L-shaped bracket 5 formed of heat- and electrical-insulating material, for example laminated plastic-impregnated fiber, and having a bottom portion 6 and upright portion 7 is mounted on the base by means of a screw 8 which goes through a hole in the base and is screwed into the bottom portion of the bracket. A notch 9 is provided in the mounting bracket 5 at the junction of the bottom portion 6 and the upright portion 7.

Figures 3, 4, 5:
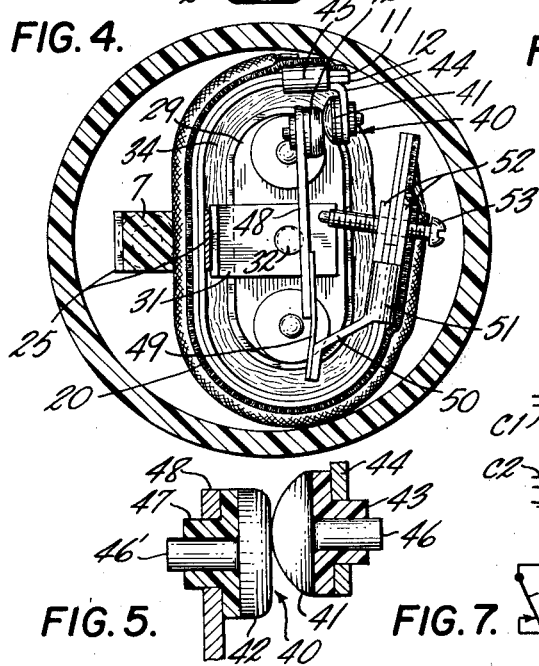
Fig. 3 is a top view with the cover removed.
Fig. 4 is a cross section on the line 4—4 in Fig. 1 somewhat enlarged.
Fig. 5 is an enlarged sectional detail of the electrical contacts.

The oven comprises a shell 10 which is tubular and open at both ends. The shell is formed of laminated sheet material comprising two layers 11 and 12 which are bonded together and have different coefficients of thermal expansion. For example, the sheet may have a layer formed of a high expansion alloy comprising approximately 22% Ni, 3% Cr, and 75% Fe and a layer formed of a low expansion alloy comprising approximately 36% Ni and 64% Fe, the two layers being bonded by heat and pressure. Each layer may have a thickness of approximately 0.0125 inch. In cross section, the shell 10 is C-shaped, comprising a back portion 13, side portions 14 and 15 and a front portion 16. The side portion 14 and front portion 16 terminate in vertical parallel edges 17 and 18, respectively, which are normally spaced from one another as shown in Fig. 3. In the present example, the outer layer 11 of the shell has a greater coefficient of expansion than the inner layer 12 so that the edges 17 and 18 move inwardly toward one another as the temperature of the shell increases.

Figure 2:
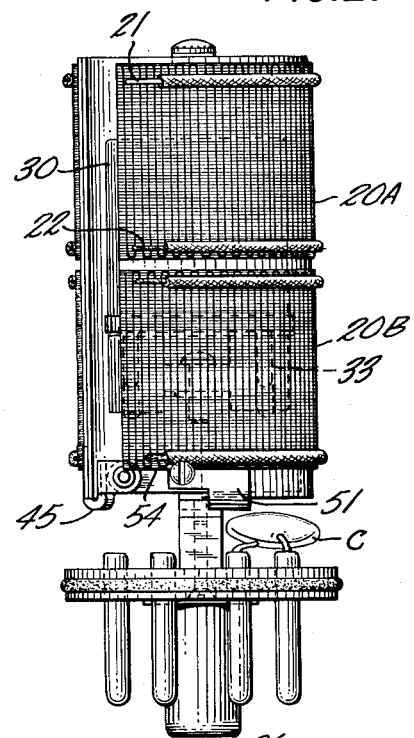
Fig. 2 is a front elevation with the cover removed and showing a modification.

The oven is heated by a heater element 20 that is shown in the form of a piece of fabric woven of fine resistance wire and an electrically insulating, heat-resisting fiber such as glass. The resistance wire is woven back and forth so as to provide a continuous path for the heating current. The glass fibers are woven crosswise of the wires with a linen weave so as to hold the wires physically in place and also insulate them from one another. The heating fabric thus formed is applied directly to the shell 10 and is held in place by cement that is electrically insulating, heat-resisting and preferably heat-conducting. In the example shown in the drawings, the heating fabric is cemented to the outside of the shell 10. While this is considered preferable, it might alternatively be inside the shell. The heating fabric is substantially coextensive with the shell so as to heat the entire shell uniformly. In Fig. 1, a single piece of heating fabric 20 covers subtsantially the entire shell. Fig. 2 illustrates a modification in which the heater element is divided into two separate portions 20A and 20B. Electrical connections are made to the opposite ends of the resistance wire of the heating fabric as indicated at 21 and 22.

The shell 10, together with the heating element 20, is supported by the insulating bracket 5. The rear wall portion 13 of the shell rests against the upright portion 7 of the bracket and the lower edge of the shell is received in the notch 9. A strap 25, formed of steel or other suitable material, extends down inside the shell and its lower end projects into the notch 9 of the bracket 5. The upper end of the strap 25 is bent outwardly and apertured to receive a screw 26 which is screwed down into a hole in the upper end of the bracket 5. A lock washer 27 may be used either above or below the outturned end portion of the strap 25. Preferably the strap 25 is spotwelded or otherwise locally affixed to an upper portion only of the shell, as indicated at 28. With the construction shown, the shell is held firmly on the bracket but, at the same time, the expansion and contraction of the shell is unrestrained. The mounting also has the advantage of thermally isolating the shell from the base 1.

A socket 29 for the crystal cartridge 30 is mounted in the shell by means of an angle bracket 31 which is spotwelded or otherwise affixed on a lower portion of the strap 25. A screw 32 secures the socket 29 to the bracket 31. The crystal cartridge 30 is provided in known manner with conenctor pins 33 which plug into suitable receptacles provided in the socket 29. These pins provide electrical connections as well as physical support for the crystal cartridge. The cartridge is thus supported approximately centrally of the shell 10 both longitudinally and transversely. The cross sectional shape of the shell corresponds to the oval shape of the cartridge with a space between the cartridge and the shell. A pad of glass wool or other suitable insulating material 34 is inserted in the upper end of the shell to provide thermal insulation.

The shell 10 not only constitutes the wall of the oven chamber but also serves as a thermostat actuating a switch 40 controlling the heating element 20. The switch 40 is shown as comprising a contact 41 having a rounded surface and a contact 42 having a relatively flat surface. The contact 41 insulated by a bushing 43 (Fig. 5) is mounted on a clip 44 having a U-shaped portion 45 that clips over the lower edge of the side portion 14 of the shell near the vertical edge 17. An electrical connection for the contact 41 is soldered onto the projecting stem portion 46. The contact 42 insulated by a bushing 47 and having a stem portion 46' is carried by a short arm 48 which is spotwelded or otherwise affixed to one end of a leaf spring 49 the other end of which is affixed to an angularly projecting portion of a clip 50 having a U-shaped portion 51 that clips over the lower edge of the front portion 16 of the shell a short distance back from the edge 18. The clips 44 and 50 are preferably spotwelded to the shell. The clip 50 which, like the clip 44, is bent up out of sheet metal also has spaced, approximately parallel portions 52 having approximately aligned tapped holes to receive an adjusting screw 53. Before the screw 53 is inserted, the portions 52 of the clip are slightly out of parallel or the tapped holes are slightly out of alignment or out of pitch so that the portions 52 must be sprung slightly by the insertion of the screw. This provides a simple and very effective means for retaining or "locking" the screw in adjusted position. The inner end of the screw is adapted to engage the arm 48 to disengage the contacts 41 and 42 when the shell contracts. The lower left hand corner of the front wall 16 of the shell is cut away, as indicated at 54 in Fig. 2, so as to clear the contact 41.

A tubular cover 55 having a closed upper end 56 encloses the entire unit. The lower end portion of the cover fits snugly over the circular base 1 which seats against a shoulder 57. The cover is held in place by a spring C-ring 58 which snaps into an internal groove provided in the lower end portion of the cover. An O-ring 59 formed of elastomer material e. g. silicone rubber is seated in a peripheral groove extending around the base 1 and makes a fluid-tight seal between the cover and the base. The cover 55 may be formed of metal, in which event it is preferably lined with heat-insulating material to provide thermal isolation of the oven from the ambient temperatures. Alternatively, the cover 55 is formed of moldable material, for example glass fiber and plastic that is strong, durable and has heat-insulating characteristics.

The terminals of the crystal socket 29 and the heating element 20 controlled by the switch 40 are connected by suitable leads to selected ones of the base pins 3 through which they are connected to the external circuit. To simplify the drawings, the connecting leads to the pins 3 have been omitted. These leads are of small diameter and preferably formed of maganin which is a poor thermal conductor, in order to contribute further to the thermal isolating of the oven and in particular the crystal. A wafer type condenser C (Fig. 2) is shown connected across the contacts controlling the heater circuit in order to suppress the generation of electrical noise by the opening and closing of the heating element switch 40.

Figure 6:
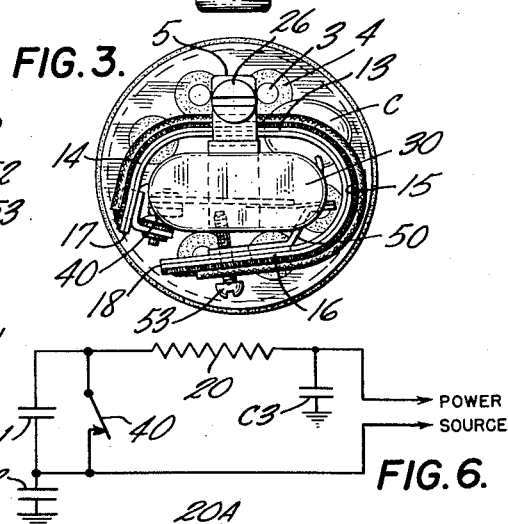
Figs. 6 and 7 are wiring diagrams showing two different noise-suppressing heater circuits for the oven.
Figure 7:
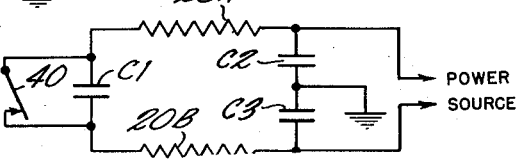

Figs. 6 and 7 illustrate two heater circuits that provide still more effective noise-suppression. In Fig. 6, three condensers C, C2 and C3 are connected as shown in circuit with a single heater element 20 and the heater control switch 40. Fig. 7 shows a preferred arrangement in which three condensers C1, C2 and C3 are connected as shown in circuit with the heater control switch 40 and a split heater comprising portions 20A and 20B. The condensers are preferably wafer-type condensers mounted on the base 1 so as to be inside the cover 55 like the condenser C illustrated in Figs. 2 and 3. The entire crystal oven including the noise suppression circuit is thus a single compact unit.

At room temperature, the contacts of the heater control switch 40 are normally closed. When the oven is turned on—by an external control—current is supplied to the heater element through the closed switch 40, thereby heating the shell 10. Owing to its laminated construction of materials having different coefficients of expansion, the shell 10 contracts as it is heated, both edges 17 and 18 moving inwardly. When a predetermined temperature, for example 75° C., is reached, the screw 53 engages the arm 48 carrying the switch contact 42, thereby moving this contact away from the contact 41 and opening the switch to cut off the heater current. Thereafter, the heater control switch 40 closes and opens intermittently to maintain the temperature constant.

Since the shell 10 constitutes both the chamber wall and the thermostat, optimum temperature control of the chamber is assured. As the heating element 20 is applied directly to the shell 10 and covers substantially its entire area, effective heating and fast cycling of the thermostat are assured. It has been found that with a 15 Watt element, the warm-uptime from —25° to 75° C., is only seven minutes. The large contact movement provided by the thermostat minimizes arcing and provides reliability of operation. As the edge 17 of the shell moves inwardly simultaneously with the inward movement of the edge 18, a wiping action of the contacts 41 and 42 is provided. This wiping action, in combination with the high contact pressures that are obtainable, serve to break down any film or barrier between the contacts, thereby assuring proper operation without the need of using sealed contacts. Adjustment of the contacts by means of the screw 53 at the front of the shell is easily effected and the adjustment is maintained. The ideal thermal connection between the thermostat and the chamber, the fast cycling and the reliability of the heater control switch provide remarkable temperature stability. The pre-set temperature is maintained with a stability of ±0.05° C.

at normal room temperature and ±0.4° C. with an ambient temperature variation from —40° Fahrenheit to 150° Fahrenheit.

A crystal oven constructed in accordance with the present invention is small, compact and light weight. It is also economical to manufacture. Many of the parts, including the shell 10, are stamped from sheet material. The entire unit can be assembled quickly and cheaply. The construction in accordance with the invention has the further advantage that the oven can be stored either cold or hot without throwing it out of adjustment. The shell 10 constituting the thermostatic control element is unrestrained and hence can expand and contract freely so that deleterious internal strains are avoided.

It will be understood that the crystal oven illustrated in the drawings is shown and described merely by way of example and that the invention is in no way limited to the specific details of the construction shown. Moreover, while the invention has been described with reference to a crystal oven, it is equally applicable to other chambers where a constant temperature is to be maintained.

What I claim and desire to secure by Letters Patent is:

1. A chamber for maintaining an element at a constant temperature comprising a temperature-sensitive cylindrical shell formed of laminated sheet material comprising a layer of lower expansion material and a layer of higher expansion material bonded together, said shell being split at least longitudinally and having a height substantially large relative to the circumference so as to form an enclosure, portions of said shell on opposite sides of said split being movable toward and away from one another by the contraction and expansion of said shell with changes in temperature, means for supporting said element inside said shell, at least one electrically operated heater applied to said shell, electrical contacts mechanically connected with portions of the shell on opposite sides of said split respectively and operable by relative movement of said shell portions, and electrical connections between said contacts and heater to control said heater in accordance with the temperature of said shell to maintain said shell and element at constant temperature.

2. A chamber for maintaining an element at a constant temperature comprising a longitudinally split cylindrical shell formed of laminated sheet material comprising a layer of lower expansion material and a layer of higher expansion material bonded together, said shell having the ratio of its height to its circumference of such an order so as to comprise a heat-retaining enclosure, portions of said shell on opposite sides of said split being movable relative to one another by the contraction and expansion of said shell with changes in temperature, means for supporting said element inside said shell, distributed electrical heating means applied to said shell and heating substantially the entire area of said shell, electrical contacts mechanically connected with portions of the shell on opposite sides of said split respectively and operable by relative movement of said shell portions and electrical connections between said contacts and said heating means to control said heating means in accordance with the temperature of said shell to maintain said shell and element at constant temperature.

3. A constant temperature chamber according to claim 2, in which said heating means is adhesively bonded to and substantially covers said shell and comprises sheet material having resistance wires woven back and forth across said material.

4. A chamber for maintaining an element at a constant temperature comprising a cylindrical shell formed of laminated sheet material comprising a layer of lower expansion material and a layer of higher expansion material bonded together, said shell having a single longitudinal split throughout its length dividing the shell into portions that are movable relative to one another by the contraction and expansion of said shell with changes in temperature, means for supporting said element inside said shell, electrically controlled means for heating said shell, cooperating electrical contacts mounted respectively on portions of said shell on opposite sides of said split, means connected to the shell and movable into and out of engagement with one contact so as to move the contacts into and out of contact with one another by the relative movement of said shell portions and electrical connections between said contacts and heating means to control said heating means in accordance with the temperature of said shell to maintain said shell and element at constant temperature.

5. A constant temperature chamber according to claim 4, in which said contacts are carried by portions of said shell disposed approximately perpendicular to one another and have interengaging faces approximately parallel with one of said portions, the movement of said shell portions producing movement of said contacts toward and away from one another and also a wiping action between said contacts.

6. A chamber for maintaining an element at a constant temperature comprising a cylindrical shell formed of laminated sheet material comprising a layer of lower expansion material and a layer of higher expansion material bonded together, said shell having a single longitudinal split extending throughout the length of the shell and dividing the shell into portions that are movable relative to one another by the contraction and expansion of said shell with changes in temperature, means for supporting said element inside said shell, electrically controlled means for heating said shell, a first electrical contact mounted on said shell on one side of said split, a spring arm mounted on said shell on the opposite side of said split, a second contact carried by said spring arm and adapted to engage said first contact, an adjustable element carried by said shell adjacent said spring arm and adapted to engage said spring arm upon relative movement of said shell portions to disengage said contacts, and electrical connections between said contacts and heating means to control said heating means in accordance with the temperature of said shell to maintain said shell and element at constant temperature.

7. A chamber for maintaining an element at constant temperature comprising a base having a plurality of electrical connecting pins, an L-shaped bracket having a shorter arm secured to said base and a longer arm projecting from said base, a cylindrical shell of laminated sheet material mounted on said bracket and comprising a layer of lower expansion material and a layer of higher expansion material, said shell having a single longitudinal split throughout its length dividing the shell into portions that are relatively movable by the expansion and contraction of said shell with changes in temperature said longer arm of said L-shaped bracket extending longitudinally along a portion of said shell circumferentially spaced from said split and a strip secured to the outer end of said longer arm and extending longitudinally inside said shell to said shorter arm to retain said shell on said bracket without restricting its expansion and contraction, means for supporting said element inside said shell, electrically controlled means for heating said shell, electrical contacts mechanically connected with portions of the shell on opposite sides of said split respectively and operable by relative movement of said shell portions and electrical connections between said contacts, pins and heating means to supply electrical current to said heating means and to control said heating means by said contacts in accordance with the temperature of said shell to maintain said shell and element at constant temperature.

8. A chamber for maintaining an element at constant temperature comprising a base having a plurality of electrical connecting pins, a bracket secured to said base, a cylindrical shell of laminated sheet material mounted on said bracket and comprising a layer of lower expansion material and a layer of higher expansion material, said shell having a single longitudinal split throughout its length dividing the shell into portions that are relatively movable by the expansion and contraction of said shell with changes in temperature, means for supporting said element inside said shell, electrically controlled means for heating said shell, electrical contacts mechanically connected with portions of the shell on opposite sides of said split respectively and operable by relative movement of said shell portions and electrical connections between said contacts, pins and heating means to supply electrical current to said heating means and to control said heating means by said contacts in accordance with the temperature of said shell to maintain said shell and element at constant temperature, and a cover enclosing said bracket and shell and having an end portion fitting on and secured to said base.

9. A chamber for maintaining an element of an electrical circuit at a constant temperature comprising a base, a plurality of terminals provided on said base, a cylindrical shell formed of laminated sheet material mounted on said base and comprising a layer of lower expansion material and a layer of higher expansion material, said shell having a single longitudinal split throughout its length dividing the shell into portions that are movable relative to one another by contraction and expansion of said shell with changes in temperature, means for supporting said element inside said shell, an electrical heater for said shell, electrical contacts mechanically connected with portions of the shell on opposite sides of said split respectively and operable by relative movement of said shell portions, electrical connections respectively from a first lead of said heater to a first one of said terminals, from a second lead of said heater to one of said contacts and from the second of said contacts to a second terminal, a first condenser connected in parallel across said contacts, a second condenser connected between said second contact and ground and a third condenser connected between said first heater lead and the ground, said first and second terminals being adapted to be connected with an external power source to supply current to said heater through said contacts.

10. A chamber for maintaining an element of an electrical circuit at a constant temperature comprising a base, a plurality of terminals provided on said base, a cylindrical shell formed of laminated sheet material mounted on said base and comprising a layer of lower expansion material and a layer of higher expansion material, said shell having a single longitudinal split throughout its length dividing the shell into portions that are movable relative to one another by contraction and expansion of said shell with changes in temperature, means for supporting said element inside said shell, an electrical heater for said shell, said heater comprising two heater units, electrical contacts mechanically connected with portions of the shell on opposite sides of said split respectively and operable by relative movement of said shell portions, electrical connections respectively from a first lead of a first one of said heater units to a first one of said terminals, from a first lead of the second of said heater units to a second terminal and from second leads of each of said heater units to said contacts respectively, a first condenser connected in parallel across said contacts, two additional condensers connected in series with one another between said first leads of said heaters and an electrical connection from a point between said two additional condensers to ground, said first and second terminals being adapted to provide connections from an external power source to said heater units under control of said contacts.

11. A chamber for maintaining an element of an electrical circuit at a constant temperature comprising a base, a plurality of terminals provided on said base, a cylindrical shell mounted on said base, means for supporting said element inside said shell, an electrical heater for said shell, said heater comprising two heater units, a pair of electrical contacts, means responsive to the temperature of said shell for moving said contacts into and out of contact with one another, electrical connections respectively from a first lead of a first one of said heater units to a first one of said terminals, from a first lead of the second of said second heater units to a second terminal and from second leads of each of said heater units to said contacts respectively, a first condenser connected in parallel across said contacts, two additional condensers connected in series with one another between said first leads of said heaters and an electrical connection from a point between said two additional condensers to ground, said first and second terminals being adapted to provide connections from an external power source to said heater units under control of said contacts.

12. A chamber for maintaining an element at constant temperature comprising a base having a plurality of electrically connecting pins, an L-shaped bracket having a shorter arm secured to said base and a longer arm projecting from said base, a cylindrical shell of laminated sheet material mounted on said bracket and comprising a layer of lower expansion material and a layer of higher expansion material, said shell having a single longitudinal split throughout its length dividing the shell into portions that are relatively movable by the expansion and contraction of said shell with changes in temperature, a support for said element centrally mounted inside said shell, electrically controlled means for heating said shell, electrical contacts mechanically connected with portions of the shell on opposite sides of said split respectively and operable by relative movement of said shell portions and electrical connections between said contacts, pins and heating means to supply electrical current to said heating means and to control said heating means by said contacts in accordance with the temperature of said shell to maintain said shell and element at constant temperature.

13. A chamber for maintaining an element at constant temperature comprising a base having a plurality of electrical connecting pins, an L-shaped bracket having a shorter arm secured to said base and a longer arm projecting from said base, a cylindrical shell of laminated sheet material mounted on said bracket and comprising a layer of lower expansion material and a layer of higher expansion material, said shell having a single longitudinal split throughout its length dividing the shell into portions that are relatively movable by the expansion and contraction of said shell with changes in temperature, said longer arm of said L-shaped bracket extending longitudinally along a portion of said shell circumferentially spaced from said split and a strip secured to the outer end of said longer arm and extending longitudinally inside said shell to said shorter arm to retain said shell on said bracket without restricting its expansion and contraction, a support for said element mounted on said strip inside said shell, electrically controlled means for heating said shell, electrical contacts mechanically connected with portions of the shell on opposite sides of said split respectively and operable by relative movement of said shell portions and electrical connections between said contacts, pins and heating means to supply electrical current to said heating means and to control said heating means by said contacts in accordance with the temperature of said shell to maintain said element at constant temperature.

References Cited in the file of this patent

UNITED STATES PATENTS

| | | |
|---|---|---|
| 1,046,777 | Hadaway | Dec. 10, 1912 |
| 1,327,207 | Lidberg | Jan. 6, 1920 |
| 2,352,439 | Landon | June 27, 1944 |
| 2,524,886 | Colander et al. | Oct. 10, 1950 |
| 2,676,274 | Kobayashi | Apr. 20, 1954 |
| 2,747,069 | Miller | May 22, 1956 |